United States Patent [19]

Kuwata et al.

[11] Patent Number: 4,478,646
[45] Date of Patent: Oct. 23, 1984

[54] APPARATUS AND METHOD FOR CLEANING A FLUIDIZED BED GAS DISTRIBUTOR

[75] Inventors: Masayoshi Kuwata, Ballston Lake; Stanley P. Urbaetis, Mechanicville, both of N.Y.

[73] Assignee: General Electric Company, Schenectady, N.Y.

[21] Appl. No.: 388,562

[22] Filed: Jun. 15, 1982

Related U.S. Application Data

[63] Continuation-in-part of Ser. No. 280,764, Jul. 6, 1981, abandoned.

[51] Int. Cl.$^3$ ............................................... B08B 7/00
[52] U.S. Cl. .......................................... 134/7; 51/439; 134/10
[58] Field of Search ....................... 134/7, 10; 165/95; 432/2, 41; 122/395; 51/317, 439

[56] References Cited

U.S. PATENT DOCUMENTS

| | | | |
|---|---|---|---|
| 2,665,119 | 1/1954 | Broman | 134/7 X |
| 2,809,018 | 10/1957 | Broman | 122/395 X |
| 4,258,505 | 3/1981 | Scheiber et al. | 51/317 X |

OTHER PUBLICATIONS

Cusdin et al., "A Marine Fluidized Bed Waste Heat Boiler", *Institute of Marine Engineers*, Trans. 1, Mar. E, vol. 91, Part 3, 1978, pp. 67–81.

*Primary Examiner*—Marc L. Caroff
*Attorney, Agent, or Firm*—Bernard J. Lacomis; James C. Davis, Jr.

[57] ABSTRACT

A means for cleaning a gas distributor of a fluidized bed comprises a pneumatic motion imparting means, such as a gas jet, for imparting motion to a cleaning medium, such that the medium strikes the gas distributor from the gas input side thereof with sufficient momentum to chip or scrape off at least a portion of any particulate matter adhering to a surface thereof. The gas jet preferably operates intermittently to maintain heat exchange efficiency and preferably is allowed to nutate to increase the area cleaned. In the method for cleaning the gas distributor, the cleaning medium is larger than the gas passages of the gas distributor. In another configuration, the cleaning medium is of the same material as the fluidized material and is smaller than the gas passages of the gas distributor, thus allowing at least a portion of the cleaning medium to pass through the distributor. The cleaning medium is replenished from the fluidized material.

9 Claims, 2 Drawing Figures

APPARATUS AND METHOD FOR CLEANING A FLUIDIZED BED GAS DISTRIBUTOR

RELATED APPLICATION

This is a continuation-in-part of co-pending application Ser. No. 280,764, filed July 6, 1981, now abandoned and assigned to the same assignee as hereof.

BACKGROUND OF THE INVENTION

This invention relates to a gas distributor of a fluidized bed. More specifically, it relates to a means and method for cleaning a gas distributor of a fluidized bed wherein the gas distributor may be subject to fouling, as for instance in a waste heat recovery process.

As the cost of energy increases, it may become economically feasible to recover some usable energy in the form of heat from a waste process stream, wherein the energy was formerly discharged into the environment. An example of a system to accomplish this is a waste heat recovery process. In a waste heat recovery process, a waste process stream having usable heat capacity, such as from an industrial operation, is made to contact a heat recovery means wherein a portion of the usable heat is recovered from the waste process stream. Typically, there may be particulate matter suspended or entrained in and carried along with the waste process stream. An example of a commercial waste heat recovery process is the recovery of heat from a hot combustion stream resulting from the incineration of waste products, such as silicones and solvents used in the manufacture thereof. These waste products can be oxidized to form particles of silicon dioxide and other materials.

The use of a fluidized bed technology is well adapted to heat recovery. A fluidized bed has the capability of operating in temperature ranges up to about 2500°-3000° F. A typical fluidized bed comprises a fluidized bed material supported by a gas distributor. The gas distributor typically has channels or passages through which a gas flows in order to fluidize the material of the fluidized bed. Carried along with the gas may be particulate matter, such as the aforementioned silicon dioxide, a product of the oxidation of silicon. Particulate matter is a source of fouling of the channels of the gas distributor. In order to prevent reduction in size or blockage of the channels, particulate matter which collects in the channels and adheres to the surfaces of the gas distributor must be removed. A prior means for removing such particulate matter from a gas distributor employed a series of wire brushes on a continuous belt which would scrape the underside or gas input side of the gas distributor. The temperature input of the gas stream to the gas distributor was about 700° F.

As a practical matter, it is desirable to provide a means and method for the removal of particulate matter introduced into the gas distributor along with the waste gas stream during a heat recovery process, which are capable of removing particulate matter without having to shut down the heat recovery process and without having to disassemble the gas distributor and fluidized bed. It is also desirable that the removal means and method not materially affect the efficiency of operation of the heat recovery process and be effective over the entire possible operating temperature range of the fluidized bed. Generally, it is only the distributor surfaces on the gas input side which will foul since the material of the fluidized bed tends to scrub the surfaces on the fluidizing side.

It is therefore an object of the present invention to provide a cleaner for a gas distributor of a fluidized bed.

Another object of the present invention is to provide a cleaner for a gas distributor wherein the gas distributor can be cleaned without disassembly.

Another object of the present invention is to provide a cleaner for a gas distributor wherein the gas distributor can be cleaned without stopping the gas flow-through for a heat recovery process.

Still another object of the present invention is to provide a cleaner for a gas distributor wherein the efficiency of the operation of a heat recovery process is not materially affected by the operation of the cleaner.

SUMMARY OF THE INVENTION

In accordance with the present invention, means for cleaning or removing particulate matter from a gas distributor for fluidizing the material of a fluidized bed is disclosed. The cleaning means comprises a motion imparting means which preferably is a gas jet. The motion imparting means may be fixed or preferably allowed to nutate, thus imparting a changing initial direction to a cleaning medium. The motion imparting means is preferably adapted to operate intermittently. In the method for cleaning or removing particulate matter from the gas distributor for fluidizing the material of the fluidized bed, the cleaning medium is made to impact the gas input side the gas distributor with a velocity sufficient to remove at least a portion of any matter adhering to the surfaces of the gas distributor. In one configuration, the cleaning medium is of the same material as the material of the fluidized bed, may pass through the gas distributor and may be replenished through a flow communication means between the fluidized bed material and the input side of the gas distributor. In another configuration the cleaning medium is larger than the gas passages through the gas distributor and thus will not pass therethrough. The cleaning medium is forced against the gas distributor either continuously or preferably intermittently by a motion imparting means wherein the direction of motion imparted to the cleaning medium may be fixed or preferably allowed to nutate. Further, the cleaning may be performed while the fluidizing gas is flowing into the fluidized bed.

DESCRIPTION OF THE INVENTION

DETAILED DESCRIPTION

Figure 1:
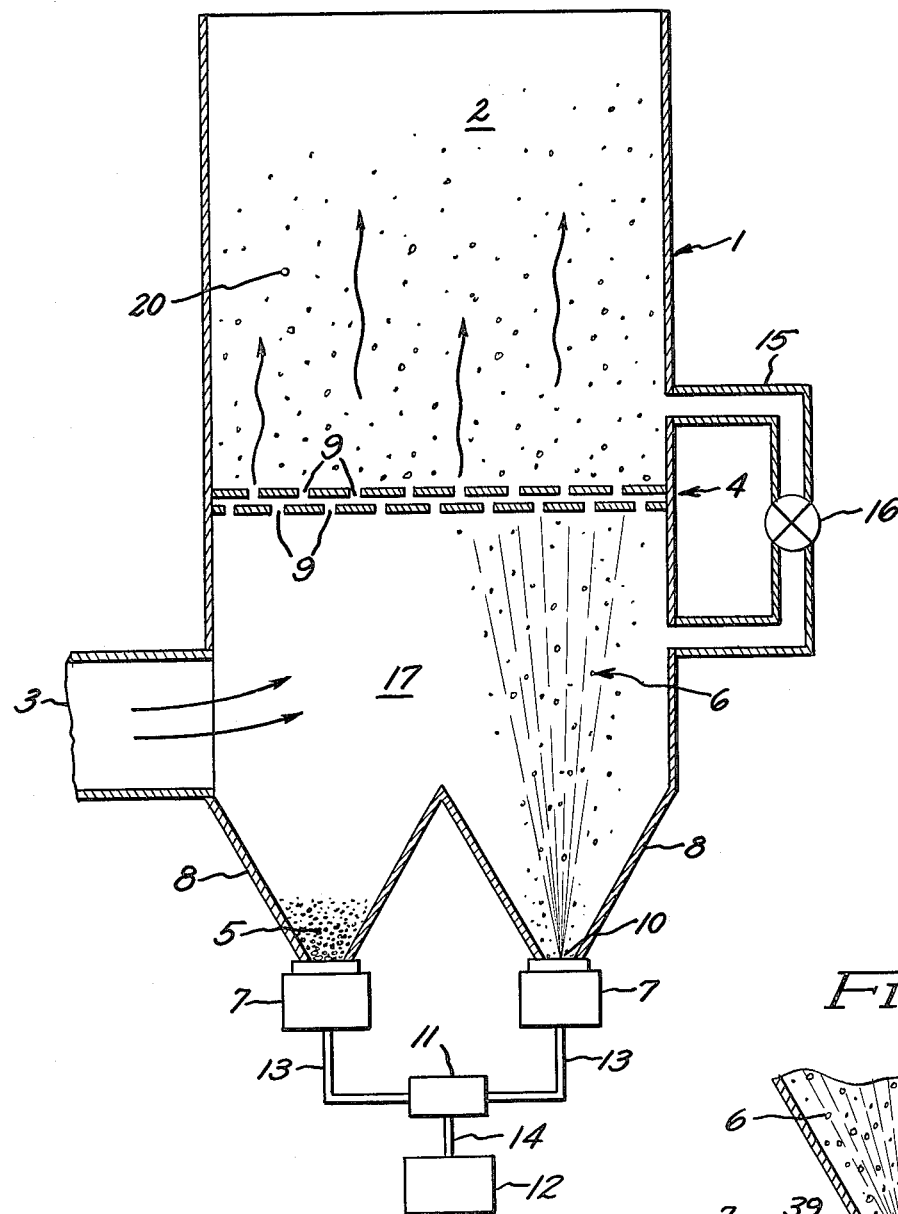
FIG. 1 is a sectional view of a gas distributor cleaning apparatus made in accordance with the present invention.

As shown in FIG. 1, a fluidized bed 2 is disposed within the upper portion of a chamber 1, which is typically a hollow rectangular prism enclosure. Fluidized bed material 20 is supported by a gas distributor 4. A gas inlet 3 is provided so that gas, such as a waste process stream, may enter the lower portion of the chamber, pass through gas distributor 4 and fluidize material 20 of the fluidized bed 2. The description so far has been of a conventional fluidized bed which may be used in a waste heat recovery process. As an example, it may be used in the recovery of heat from the gaseous hot combustion stream resulting from the incineration of waste products, such as waste silicones and solvents used in the manufacture thereof. These waste products can be oxidized to form particles of silicon dioxide and other materials. The resulting heat laden waste gas and particulate matter from the oxidation process may be introduced into chamber 1 at gas inlet 3 thereof as a waste process stream. The temperature of this stream is typically about 1900° F. As this waste process stream passes through gas distributor 4, a portion of the particulate matter will adhere to surfaces of gas distributor 4. A build up of these particles will foul gas passages or channels 9 through gas distributor 4, causing undesirable gas pressure drops across these passages and eventually a total blockage of passages 9, with a resulting loss of fluidization above the blocked passages 9. The portion of the waste process stream which passes through gas distributor 4 contacts material 20 of fluidized bed 2, fluidizing it and transferring some of its heat thereto. Material 20 of fluidized bed 2 may further contact a heat extraction means (not shown), such as a heat exchanger, wherein a portion of the heat removed from the waste process stream is recovered from material 20.

In order to minimize fouling and to prevent blockage of gas passages 9 in gas distributor 4, cleaning means 7 is provided. Cleaning means 7 comprises a motion imparting means, 10 such as a mechanical impactor or preferably a gas or pneumatic jet, disposed at the apex of storage portion or receptacle 8 of chamber 1 for containing the cleaning medium 5 (at rest) and 6 (activated). Cleaning medium 5 and 6 is typically granular material which must be able to withstand the temperature of the waste process stream without a high rate of size reduction or disintegration and may comprise, for instance, silica sand or alumina.

Storage portion 8 is located relative to gas distributor 4, to be cleaned from the underside or gas input side, without interrupting the flow of the waste gas of the heat recovery process. A gas source 12 is in gas flow communication with control means 11, such as a valve, by conduit means 14 and control means 11 is in gas flow communication with the gas jet 10 by conduit means 13. Although shown as separate devices, gas source 12 and control means 11 may be within the same unit. Control means 11 permits gas jet 10 to be operated either continuously, or preferably intermittently by selectively timing its open and closed positions.

Figure 2:
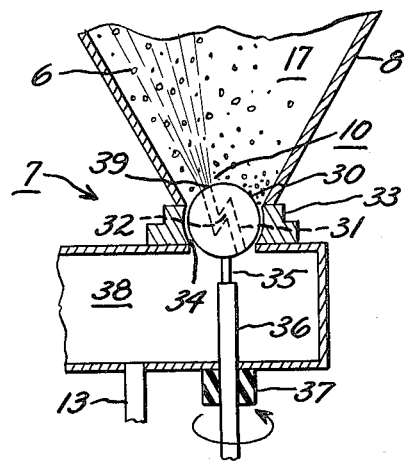
FIG. 2 is a sectional view of a cleaning means made in accordance with the present invention.

Shown in FIG. 2 is an embodiment of a cleaning means 7 made in accordance with the present invention. Cleaning means 7 is disposed at the apex or lower part of storage portion 8 and comprises gas jet 10 and gas chamber or plenum 38. Conduit 13 is coupled to gas chamber 38 to supply gas from valve 11 (shown in FIG. 1) thereto. Gas jet 10 further comprises ball means 30 disposed in a seal and retainer guide 33 and having a bore 31 therethrough. Bore 31 forms a communicating gas path between gas chamber 38 and gas input region 17. Bore 31 preferably comprises a tortuous path 32 in order to prevent cleaning medium 6 from entering chamber 38 therethrough. Ball means 30 is preferably disposed within seal and retainer guide 33 such that a gas passage 34 exists therebetween in order to permit a small portion of the gas in chamber 38 to flow along the outer contour of ball means 30 and thereby cool it. The size of passage 34 is determined by considering the amount of cooling of ball means 34 desired along with the required gas flow through bore 31, since as the size of passage 34 is increased, more gas will flow therethrough thereby bypassing bore 31. Ball means 30 is affixed to rotating means 36, such as a shaft, either directly or preferably by pin 35 affixed to ball means 30 and to a slide jet coupling (not shown) in the end of shaft 36. Sealing means 37 is provided to prevent gas from flowing out of chamber 38 along shaft 36. Bore 31 is preferably disposed along an axis or diameter through ball means 30 other than parallel to or collinear with the axis of rotation of ball means 30 through shaft 36, thus causing outlet 39 thereof to nutate about the axis of rotation of ball means 30. Chamber 38 may be extended (not shown) to cooperate with other cleaning means 7 in a similar manner, thereby eliminating the need for additional conduit 13 from valve 11. Shaft 36 is coupled to a drive means, such as a motor (not shown). Alternatively, ball means 30 may be truncated to provide a flat surface at the outlet 39 of bore 31.

Alternatively, a plurality of cleaning means (not shown), such as stationary gas jets, may be disposed along storage portion 8 and positioned such that gas emanating from each of the jets will intercept the distributor at a different angle thereby causing cleaning medium to be spread over the distributor surface. The gas jets would be connected to a pneumatic control means (not shown) for actuating the jets in a predetermined pattern to effect high cleaning efficiency.

The operation of the cleaning process wherein cleaning means 7 comprises a gas jet 10 is as follows. For ease of explanation and not by way of limitation, two cleaning means 7 are shown in FIG. 1, with cleaning medium 6 shown activated. However, a single cleaning means 7 may be used and its use is not to be precluded by the drawing. A multiple arrangement may also be employed wherein any number of cleaning means 7 may be grouped together. Cleaning medium 5 is initially at rest in storage portion 8. Gas jet 10 is activated by gas from gas source 12 by opening control means 11 in order to provide gas to chamber 38 through conduit 13, thereby increasing the gas pressure in chamber 38 above the gas pressure in input region 17. This increased pressure will cause gas to flow through bore 31 and passage 34 and contact cleaning medium 5(FIG. 1). The increased presssure is preselected to provide a sufficient gas flow to cleaning medium 5 in order to cause cleaning medium (as at 6) to be propelled with a velocity sufficient to cause at least a portion thereof to strike gas distributor 4 with momentum sufficient to remove at least a portion of any matter adhering to surfaces of gas distributor 4. The action of cleaning medium 6 striking gas distributor 4 causes a chipping or scrubbing of the surfaces of gas distributor 4. This chipping or scrubbing tends to remove any particulate matter which has adhered to gas distributor 4. Gas jet 10 may be operated either continuously or preferably intermittently. Intermittent operation is preferred in order to supply a minimum amount of gas, which is generally cooler than the waste process stream, from gas source 12, because this cooler gas will tend to cool the material 20 of fluidized bed 2, thus reducing the efficiency of the waste heat recovery process. The gas may be any gas which does not significantly react with or is inert with respect to, material 20 of fluidized bed 2, such as neon, argon, helium or nitrogen, or air.

The size of cleaning medium 5 and 6 will be determined by the nature of the particulate matter entrained in the waste gas stream. If the nature of the particulate matter permits, cleaning medium 5 and 6 larger than passages 9 through gas distributor 4 may be used. This larger cleaning medium 5 and 6 will not pass through passages 9 of gas distributor 4 and will return to storage portion 8 after gas jet 10 has been deactivated. When desirable for cleaning medium 5 and 6 to pass through passages 9 of gas distributor 4 and into fluidized bed 2, cleaning medium 5 and 6 may be of the same material as material 20 of fluidized bed 2 and smaller than passages 9 therethrough. In order to replenish cleaning medium 5 and 6 which passes through passages 9 of gas distributor 4, a flow communication means 15, such as a duct may be provided between fluidized bed 2 and gas input region 17 of gas distributor 4. A control means 16, such as a valve, is provided to regulate gas and material flow in duct 15. Control means 16 is normally closed and prevents the flow of the waste process stream through duct 15 from gas input side 17 to the fluidized bed 2 side of gas distributor 4 and thereby by-passing gas distributor 4. When it is desired that fluidized material 20 replenish cleaning medium 5 and 6 which has passed through passages 9 of gas distributor 4 during the cleaning process, control means 16 is adjusted to permit fluidized material 20 to flow to gas input side 17 of gas distributor 4. By choosing the appropriate material for cleaning medium 5 and 6, and for fluidized material 20, the operation of cleaning means 7 can be made effective over the entire possible operating temperature range of the fluidized bed 2.

Ball means 10 may be rotated about the axis of rotation through shaft 38, causing output 39 of bore 31 to follow a substantially circular path, whereby output 39 is nutated about the axis of rotation through shaft 36. Gas emanating from output 39 of bore 31 will thus impart a direction, which changes at different points in the circular path of output 39 of bore 31, to cleaning medium 5 and 6. A wider angle for the direction of the motion imparted to cleaning medium 5 and 6 can be obtained by allowing gas jet 10 to nutate, whereby a resulting larger area of gas distributor 4 can be impacted by cleaning medium 5 and 6 from a single gas jet 10. Where a plurality of cleaning means 7 are employed, the pattern of cleaning medium 5 and 6 which imparts gas distributor 4 is made to overlap to ensure that the entire gas distributor 4 is cleaned.

Thus has been shown and described a cleaner for a gas distributor of a fluidized bed wherein the distributor can be cleaned without disassembly and without stopping the gas flow-through for a heat recovery process. Further, the efficiency of the heat recovery process is not materially affected by the operation of the cleaner.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A cleaning means for removing matter adhering to a gas distributor of a fluidized bed, said gas distributor having a gas input side, comprising:
   nozzle means having a bore therethrough, said bore having a gas input and a gas output wherein said gas output is disposed in gas flow communication with said distributor;
   pneumatic means coupled to said gas input of said bore for imparting motion to a cleaning medium being disposed on the gas output side of said bore such that at least a portion of said medium contacts said gas distributor from the gas input side thereof with a velocity sufficient to remove at least a portion of any matter adhering to a surface thereof; and
   retainer means spaced from said nozzle means to form a channel having an input coupled to said pneumatic means and an output coupled to the gas output side of said bore, said channel providing a gas flow path between said pneumatic means and the gas output side of said bore.

2. The cleaning means as in claim 1 wherein said nozzle means is rotatably mounted.

3. The cleaning means as in claim 2 wherein said nozzle means comprises a ball means having said bore therethrough.

4. The cleaning means as in claim 3 wherein said bore is directed along a tortuous path.

5. The cleaning means as in claim 1 further comprising control means coupled to said pneumatic means for operating said pneumatic means intermittently.

6. The cleaning means as in claim 1 wherein said bore is directed along a tortuous path.

7. A method of cleaning a fluidized bed gas distributor having gas passages therethrough for fluidizing a material, comprising:
   supplying a particulate cleaning medium of particle size smaller than said gas passages, wherein said cleaning medium comprises the same substance as said material;
   imparting motion to said cleaning medium, while fluidizing said material, such that at least a portion of said cleaning medium contacts said gas distributor from the gas input side thereof with a velocity sufficient to remove at least a portion of any matter adhering to a surface of said gas distributor;
   permitting at least a portion of said cleaning medium to pass through said passages; and
   replenishing from said material said cleaning medium which passes through said passages.

8. The method as in claim 7 further comprising using pneumatic means to impart motion to said cleaning medium.

9. The method as in claim 8 further comprising nutating said pneumatic means, whereby the direction of motion imparted to said cleaning medium is changed.

* * * * *